United States Patent [19]

Omlie

[11] Patent Number: 4,474,272
[45] Date of Patent: Oct. 2, 1984

[54] HYDRAULIC BRAKE CYLINDER FLUID SUPPLY AND BLEEDING MECHANISM

[75] Inventor: Donald E. Omlie, Rochester, Mich.

[73] Assignee: General Motors Corporation, Detroit, Mich.

[21] Appl. No.: 465,297

[22] Filed: Feb. 9, 1983

[51] Int. Cl.³ .............................................. B60T 11/30
[52] U.S. Cl. ...................................... 188/352; 60/584
[58] Field of Search ...................... 60/584; 137/614.16, 137/614.17, 614.18; 188/352

[56] References Cited

U.S. PATENT DOCUMENTS

| | | | |
|---|---|---|---|
| 2,146,545 | 2/1939 | Leighton | 188/352 X |
| 2,256,516 | 9/1941 | Carlin | 188/352 X |
| 4,318,460 | 3/1982 | Kosinski | 188/352 |

Primary Examiner—Duane A. Reger
Attorney, Agent, or Firm—D. D. McGraw

[57] ABSTRACT

The wheel cylinder bleed passage is incorporated in the brake fluid connector mounting bolt and includes a ball check valve assembly fitting for bleeding purposes.

3 Claims, 2 Drawing Figures

HYDRAULIC BRAKE CYLINDER FLUID SUPPLY AND BLEEDING MECHANISM

The invention relates to an arrangement for supplying hydraulic brake fluid to actuate a brake wheel cylinder and for bleeding air from the wheel cylinder as necessary. It more particularly relates to the provision of a bleed passage incorporated in the hydraulic coupling which connects the brake hose to the wheel cylinder.

The typical wheel cylinder brake fluid supply and bleed arrangement involves the provision of a hydraulic coupling assembly connected to the wheel cylinder housing so that pressurized brake fluid is introduced into the wheel cylinder. At the uppermost part of the wheel cylinder chamber, a passage leading to the atmosphere has a bleed screw therein which is normally closed. To bleed air out of the wheel cylinder, the screw is threaded outwardly to open up a valve formed by a part of the bleed screw and the wheel cylinder housing. Pressurization of hydraulic brake fluid through the hydraulic coupling assembly will force any air within the wheel cylinder out through the bleed screw. When the air has been bled out, the screw is retightened. When the brake unit of which the wheel cylinder is a part has been operated for a period of time such as several months or even two or three years, it is common to bleed the brake system of air after replacing the brake lining. The bleeder screw is sometimes quite difficult to rotate so as to thread it outwardly for bleed purposes. Also, the bleeder screw and the coupling arrangement require separate installation operations, which consume additional time during original assembly.

By using structure embodying the invention herein disclosed and claimed, the bleed mechanism and the hydraulic coupling assembly are combined into a common subassembly which is quickly and easily installed. The arrangement eliminates the bleeder screw as currently used as well as simplifying the manufacture of the wheel cylinder. It requires only one threaded opening in the wheel cylinder housing instead of two such openings. It locates the bleed mechanism further away from the wheel cylinder so that it is less likely to be adversely affected by heat generated during brake application.

IN THE DRAWING

Figure 1:
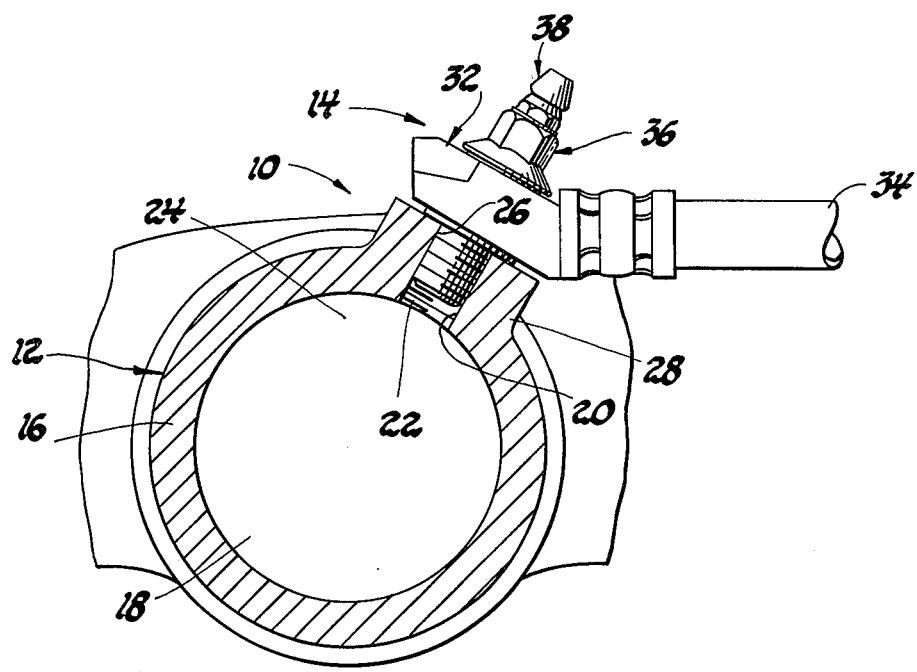
FIG. 1 is an elevation view of a brake wheel cylinder assembly having parts broken away and in section and including a brake fluid supply and bleeding mechanism embodying the invention.

The brake wheel cylinder assembly 10 is illustrated as being a part of a disc brake assembly. It is to be understood, however, that it may be a part of other types of brake assemblies requiring wheel cylinders. For example, it may be used with drum brakes or internal or external band brakes. The wheel cylinder assembly 10 has a wheel cylinder 12 and a hydraulic brake fluid supply and bleeding mechanism 14. The wheel cylinder 12 includes a housing 16 having a chamber 18 formed therein and arranged to receive hydraulic brake fluid under pressure to actuate the brake assembly of which assembly 10 is a part. It is common practice to have one or more pistons reciprocably received in chamber 18 so that pressurized hydraulic brake fluid can act on them in a manner well known in the art. Housing 16 has a passage 20 extending through the housing so that one passage end 22 opens into the uppermost part 24 of chamber 18 when the brake assembly is in its installed and running position. The other passage end 26 opens to the atmosphere through a boss 28 formed as a part of housing 16. Passage 20 has internal threads 30 formed therein.

The brake fluid supply and bleeding mechanism 14 includes a brake fluid hose connector 32 to which a brake fluid hose 34 is secured, a mounting bolt 36 and a bleeder check valve assembly 38. The various elements and their cooperative arrangement in assembled form are illustrated in detail in FIG. 2.

The connector 32 includes a connector housing 40 which has a bolt-receiving passage 42 extending therethrough between housing faces 44 and 46. One side of housing 40 has a suitable connection 48 to which the brake fluid hose 34 is sealingly secured. An inlet port 50 communicates with the fluid hose through connection 48 so as to intersect the bolt-receiving passage 42 within housing 40 and between faces 44 and 46.

Figure 2:
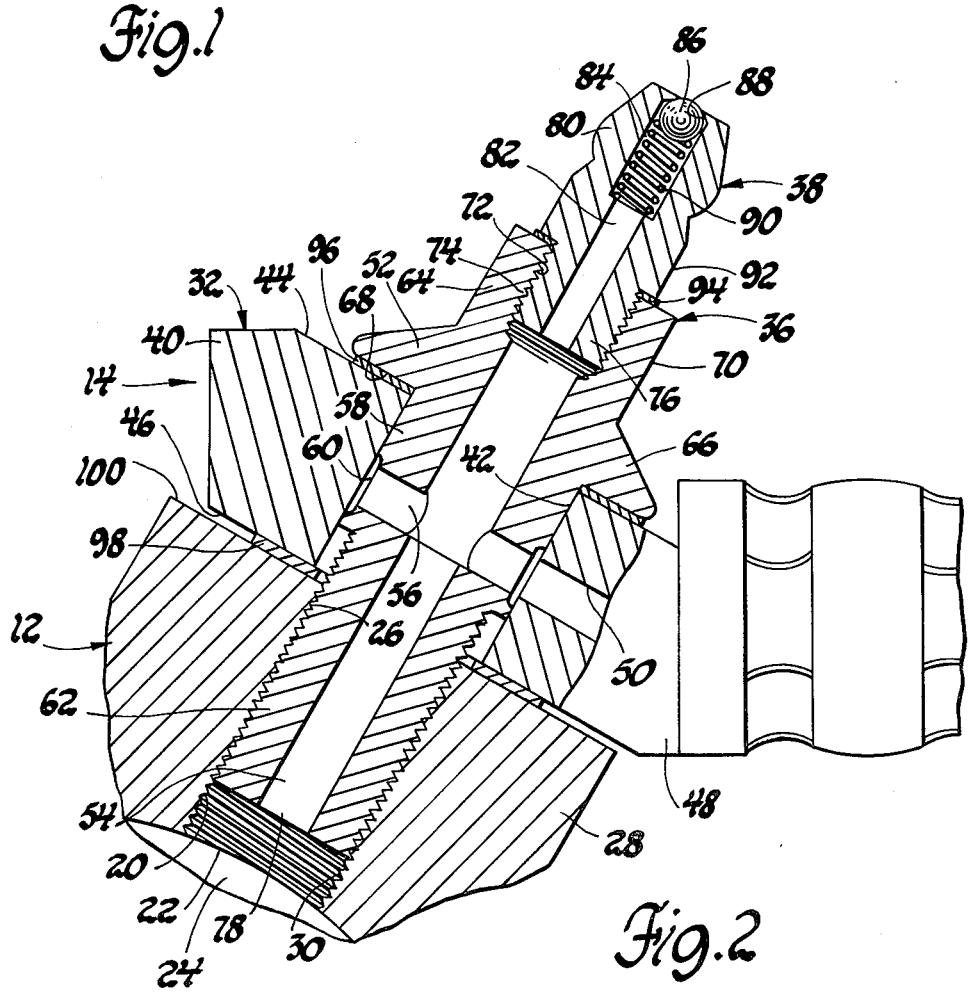
FIG. 2 is a cross-section view of a portion of the assembly of FIG. 1, with parts broken away, and illustrates the brake fluid supply and bleeding mechanism in greater detail.

The mounting bolt 36 has a bolt body 52 through which a first bolt passage 54 is axially formed. A second bolt passage 56 is formed transversely of the center body portion 58 of the bolt body so that it intersects first bolt passage 54. A groove 60 is formed about the bolt center portion 58 so that passage 56 opens into the groove. As seen in FIG. 2, when the bolt is assembled relative to connector 32, inlet port 50 is in fluid communication with groove 60 and therefore with bolt passages 56 and 54. The bolt body has an externally threaded inner end 62 which is somewhat smaller in diameter than the bolt center portion 58 so that it may be inserted freely through the connector bolt-receiving passage 42 for assembly. The threads on bolt inner end 62 mate with the threads 30 of the housing passage 20 for assembly and retention. The bolt outer end 64 has an integrally formed flange 66 defining an annular flange face 68. The bolt outer end 64 terminates in a hex nut section 70 for receipt of a suitable bolt installation and removal tool. The outer end 72 of the first bolt passage 54 opens axially through the hex nut section 70 and has internal threads 74 formed therein to receive the externally threaded end 76 of the bleeder check valve assembly 38. The inner end 78 of the first bolt passage 54 opens through the inner bolt end so that it is in fluid communication with chamber 18. In the installed position, the bolt inner end 62 terminates within housing passage 20 so that it does not extend into the chamber 18 and interfere with piston reciprocation.

The bleed check valve assembly 38 includes a body 80 of which the externally threaded end 76 is a part. A bleed passage 82 is formed axially through body 80 and has an enlarged outer portion 84 defining a valve chamber. A ball check valve 86 of a somewhat smaller diameter than passage portion 84 is reciprocably received in passage portion 84. An annular valve seat 88 is formed at the outer end of passage 82 in a suitable manner so that the ball check valve 86 seats thereon to close passage 82. A valve spring 90 within passage portion 84 continually urges valve 86 against its seat 88. The valve assembly body 80 has a hex center section 92 to receive a suitable installation and removal tool. The portion of body 80 in which the enlarged passage portion 84 is contained is also preferably externally formed with a head to receive a bleed hose thereon, in a manner well known in the art.

The bleeder check valve assembly 38 is preassembled in the outer end of bolt passage 54 as is illustrated in detail in FIG. 2. If valve assembly 38 is of the type illustrated, which is similar to grease fittings in common use, it is preferable that it be larger than the grease fittings on the vehicle to prevent inadvertent injection of grease into the brake system. A suitable seal 94 may be provided between the bolt end and the body 80 to insure against the loss of brake fluid past threads 74. Another seal 96 is positioned between the connector housing face 44 and the bolt flange face 68 to seal against leakage through the outer part of passage 42. Another seal 98 is positioned between connection housing face 46 and the face 100 formed on the outer end of boss 28. The seals noted above may be copper washers by way of example, and the faces 44, 46, 68 and 100, or some of them, may be serrated to further insure good seals. Bolt 36 is inserted through passage 42 and then threaded into housing passage 20. As it is tightened into housing 16, sufficient pressure is exerted between the seals and adjacent faces to produce tight seals to prevent any hydraulic brake fluid from leaking out of chamber 18 through the mechanism 14.

The spring 90 holds ball check valve 86 against its seat 88 and is sufficiently strong to resist vacuum bleeding pressure exerted on the valve during a vacuum bleeding operation performed at initial assembly of the brake system. As is well known in the art, vacuum bleeding is accomplished by evacuating air in the hydraulic brake fluid lines at the master cylinder and hydraulic brake fluid is introduced. Thus it may be that the bleeder check valve assembly 38 is not used at this time for initial bleeding. As original equipment, the mounting bolt 36 may have a screw plug threaded into bolt passage 54 in cooperation with threads 74, sealing the passage outer end 72. Only when it becomes necessary to bleed the brake system would the screw plug be removed and replaced with the bleeder screw 38. It is also to be understood that the bleeder screw 38 may be of the type currently in common usage, the passage outer end 72 being machined for receiving and cooperating therewith.

When the brake system is to be bled at some later time, a suitable hydraulic coupling may be snapped over the head of the valve body 80 to produce a tight seal. At the same time, the coupling will depress the valve 86 against spring 90, allowing air in chamber part 24 to be bled out of chamber 18 through passages 20, 54 and 82. A tube connected to the bleeder coupling will conduct the air and any brake fluid removed from the assembly to an appropriate container. The operator conducting the bleeding of the system can visually determine when all of the air has been bled if the tube is transparent.

The mechanism herein disclosed and claimed does not require the loosening of any bleeder screws to bleed the system or to drain brake fluid. Should the bleeder check valve assembly have to be replaced, there is no risk of damaging the entire wheel cylinder housing, and at most a new mounting bolt 36 and cylinder check valve assembly 38 together with new seals, may be required. The replacement of these items may be readily and inexpensively accomplished.

The embodiments of the invention in which an exclusive property or privilege is claimed are defined as follows:

1. In a brake wheel cylinder assembly having a housing having a chamber formed therein, a brake fluid hose connector secured to said housing, a passage formed in said housing and opening into said chamber, and a connector bolt extending through said connector and into said passage to secure said connector to said housing, the wheel cylinder bleeding arrangement comprising:
   said wheel cylinder housing passage having one end opening into the uppermost part of said chamber formed in said housing and the passage other end receiving said connector bolt;
   a passage formed axially through said connector bolt and cooperating with a passage in said connector and with said housing passage to selectively conduct hydraulic brake fluid into and out of said chamber under pressure;
   and screw means installed in the end of said connector bolt passage opposite said housing passage and normally sealing that passage and said screw means being selectively a bleeder screw or a screw plug which is removable to permit a bleeder screw to be installed in place, said bleeder screw when installed providing for selective bleeding said chamber of air collected therein.

2. A hydraulic brake fluid supply and bleeding mechanism for a vehicle brake wheel cylinder and the like, said mechanism comprising:
   a housing having a chamber therein normally filled with hydraulic brake fluid but upon occasion having some air therein which must be bled out, said chamber selectively receiving pressurized hydraulic brake fluid;
   a mounting bolt;
   a hydraulic brake fluid hose connector having an inlet port and a bolt-receiving passage intersecting said inlet port, said mounting bolt extending through said bolt-receiving passage and having seal means held by said bolt in sealing relation with said hose connector on both sides of the intersection of said boltreceiving passage with said inlet port;
   a passage in said housing having one end communicating with an uppermost part of said chamber and the other end threadedly receiving said mounting bolt, said bolt securing said hydraulic brake fluid hose connector to said housing;
   said mounting bolt having an externally threaded inner end threaded into said housing passage other end and having a portion of said seal means sealing said hose connector relative to said housing at said passage other end, a first bolt passage formed axially through said mounting bolt, and a second bolt passage intersecting said first bolt passage and in continuous fluid flow communication with said connector inlet port and said housing passage through said first bolt passage;
   and a bleeder screw sealingly mounted in said first bolt passage in the end thereof opposite said housing passage, said check valve bleeder screw providing means for attaching a bleeder hose opening said check valve to bleed any air from said chamber and conduct any bled hydraulic brake fluid to a receptacle for same.

3. An improved arrangement for bleeding hydraulic fluid from the housing of a brake wheel cylinder assembly, said housing having a brake cylinder cavity formed therein with a bleed channel selectively connecting the top periphery of said cavity to atmosphere, a brake fluid hose connector for said housing including conduit means adapted to place brake fluid in communication with said bleed channel, and a connector bolt extending through said connector and into said bleed channel in a manner to secure said connector to said housing and sealingly interconnect said conduit means, a passage formed through said connector bolt in communication with the conduit means in said connector and with the bleed channel in said housing for selectively conducting hydraulic brake fluid into and out of said brake cylinder cavity under pressure;

and a bleeder screw secured in the end of said connector bolt passage opposite said bleed channel for selectively bleeding said cavity of air collected therein.

* * * * *